US012633308B2

(12) United States Patent　　　(10) Patent No.:　US 12,633,308 B2

Osada　　　(45) Date of Patent:　May 19, 2026

(54) MAGNETIC TAPE CARTRIDGE, MAGNETIC TAPE DRIVE SYSTEM, AND MAGNETIC TAPE CARTRIDGE MANUFACTURING METHOD

(71) Applicant: FUJIFILM CORPORATION, Tokyo (JP)

(72) Inventor: Yoshihiko Osada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/780,473

(22) Filed: Jul. 23, 2024

(65) Prior Publication Data

US 2025/0069624 A1　Feb. 27, 2025

(30) Foreign Application Priority Data

Aug. 23, 2023　(JP) ................................. 2023-135731

(51) Int. Cl.
　　*G11B 5/78*　　　(2006.01)
　　*G11B 5/84*　　　(2006.01)

(52) U.S. Cl.
　　CPC . *G11B 5/78* (2013.01); *G11B 5/84* (2013.01)

(58) Field of Classification Search
　　None
　　See application file for complete search history.

(56) References Cited

U.S. PATENT DOCUMENTS

| | | | | |
|---|---|---|---|---|
| 4,889,982 | A * | 12/1989 | Young .................... | G06K 19/08 |
| | | | | 235/487 |
| 5,083,816 | A * | 1/1992 | Folga ...................... | B42F 21/04 |
| | | | | 235/462.07 |
| 5,351,159 | A * | 9/1994 | Dodt .................... | G11B 23/107 |
| 5,895,075 | A * | 4/1999 | Edwards .............. | G09F 3/0292 |
| | | | | 283/81 |
| 6,065,701 | A | 5/2000 | Tanimura et al. | |
| 6,466,389 | B1 * | 10/2002 | Ochi ...................... | G11B 15/07 |
| 7,909,363 | B2 * | 3/2011 | Anderson ............. | G09F 3/0288 |
| | | | | 283/105 |
| 2002/0145034 | A1 * | 10/2002 | Shimada ................ | G11B 15/07 |
| 2003/0030938 | A1 * | 2/2003 | Hashimoto ............ | G11B 15/07 |
| | | | | 360/92.1 |
| 2005/0230470 | A1 * | 10/2005 | Hoshino ............ | G11B 15/6835 |
| 2007/0008641 | A1 | 1/2007 | Tada et al. | |

(Continued)

FOREIGN PATENT DOCUMENTS

| | | | |
|---|---|---|---|
| CN | 2472295 Y | * | 1/2002 |
| CN | 205581925 U | * | 9/2016 |

(Continued)

*Primary Examiner* — William J Klimowicz

(74) *Attorney, Agent, or Firm* — SOLARIS Intellectual Property Group, PLLC

(57)　　　　　ABSTRACT

Provided are a magnetic tape cartridge, a magnetic tape drive system, and a magnetic tape cartridge manufacturing method capable of suppressing tampering of the magnetic tape cartridge. There is provided a magnetic tape cartridge including: a label that is provided on an outer surface of a case and on which an identifier is displayed, in which a marking for visually recognizing an attachment state of the label with respect to the case is applied, the marking being a mark formed across the label and the case.

15 Claims, 9 Drawing Sheets

(56) References Cited

U.S. PATENT DOCUMENTS

| | | | | |
|---|---|---|---|---|
| 2007/0221736 A1* | 9/2007 | Bailey | ................... | G09F 3/0292 |
| | | | | 235/487 |
| 2012/0081747 A1 | 4/2012 | Kobayashi | | |
| 2015/0009012 A1* | 1/2015 | Wu | .................. | G06K 19/07381 |
| | | | | 340/10.1 |
| 2017/0228629 A1* | 8/2017 | Albinyana | ............. | G06K 1/121 |
| 2018/0225561 A1 | 8/2018 | Kagawa | | |
| 2019/0095664 A1* | 3/2019 | Suzuki | ............... | G06K 17/0012 |
| 2020/0104665 A1* | 4/2020 | Kagawa | ............. | G06K 7/10544 |
| 2020/0285425 A1* | 9/2020 | Terafuji | ................. | G06F 3/1256 |
| 2020/0311355 A1* | 10/2020 | Osako | .................... | G06K 1/121 |
| 2020/0327291 A1* | 10/2020 | Osako | .................... | G11B 23/40 |
| 2024/0282340 A1* | 8/2024 | Osada | .................... | G11B 23/40 |
| 2025/0069626 A1* | 2/2025 | Sumiya | ................ | G11B 33/022 |
| 2025/0218312 A1* | 7/2025 | Robbers | ................ | G09F 3/0292 |
| 2025/0252425 A1* | 8/2025 | Glinert | ................ | G06Q 20/354 |

FOREIGN PATENT DOCUMENTS

| | | | | |
|---|---|---|---|---|
| EP | 3155556 B1 * | 12/2019 | .......... | G06K 7/1434 |
| JP | H10-144048 A | 5/1998 | | |
| JP | H10-269744 A | 10/1998 | | |
| JP | 2005-135487 A | 5/2005 | | |
| JP | 2007-018592 A | 1/2007 | | |
| JP | 2012-079085 A | 4/2012 | | |
| JP | 2018-129103 A | 8/2018 | | |
| JP | 2020-161199 A | 10/2020 | | |

* cited by examiner

FIG. 7
```
   ( ATTACHMENT STEP )
           │
 ┌─────────────────────────┐
 │   ATTACH LABEL TO CASE   │──── ST10
 └─────────────────────────┘
           │
 ┌─────────────────────────┐
 │  APPLY MARKING ACROSS    │──── ST12
 │     LABEL AND CASE       │
 └─────────────────────────┘
           │
        ( END )
```
FIG. 8
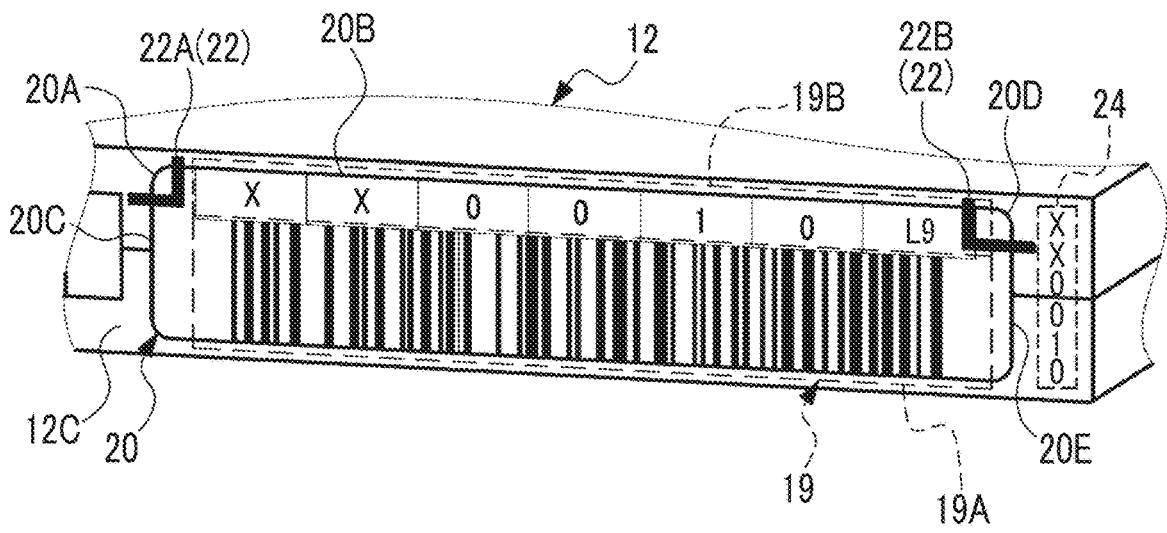
FIG. 9
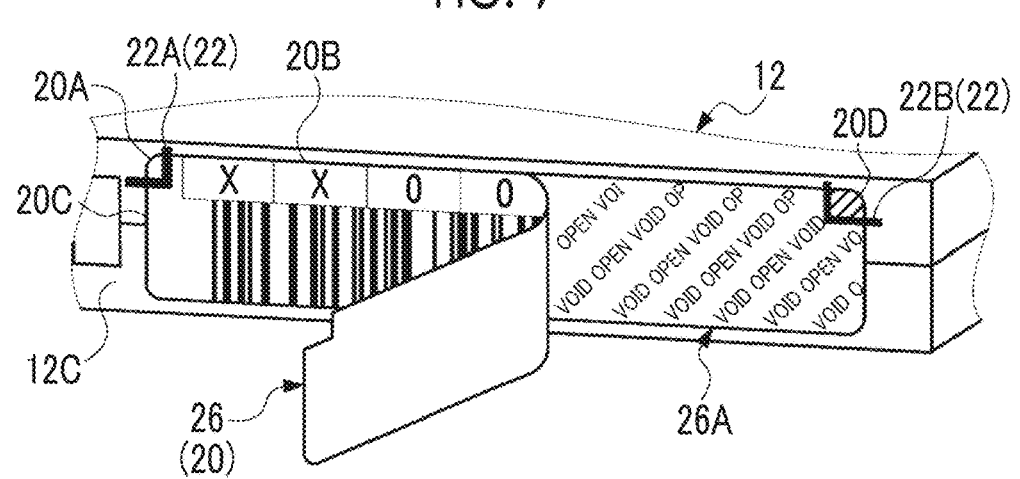

FIG. 10

INDENTIFIER
INFORMATION
XX0010

MAGNETIC TAPE CARTRIDGE, MAGNETIC TAPE DRIVE SYSTEM, AND MAGNETIC TAPE CARTRIDGE MANUFACTURING METHOD

CROSS-REFERENCE TO RELATED APPLICATIONS

This application is based on and claims priority under 35 USC 119 from Japanese Patent Application No. 2023-135731, filed Aug. 23, 2023, the disclosure of which is incorporated herein by reference in its entirety.

TECHNICAL FIELD

The technology of the present disclosure relates to a magnetic tape cartridge, a magnetic tape drive system, and a magnetic tape cartridge manufacturing method.

RELATED ART

JP2018-129103A describes a recording system comprising: a reading unit that reads information recorded on a first recording medium which is incorporated in a recording tape cartridge and from which the recorded information can be read in a non-contact manner; and a recording unit that records the information read by the reading unit on a second recording medium on which the recorded information can be visually recognized from an outside.

JP1998-269744A (JP-H10-269744A) describes a cassette label to be adhered to a cassette-type recording medium in which a recording medium is accommodated, the cassette label including: an integrated circuit that includes a storage unit and a signal processing unit; an antenna unit that at least transmits a signal to the integrated circuit; a label base body that accommodates the integrated circuit and the antenna unit in a shape capable of being adhered to any cassette label adhesion portion of the cassette-type recording medium as an adhesion target, that includes an outer surface on which a certain character, graphic, or the like can be described, that includes a mark indicating a predetermined distance from the accommodated antenna unit at a predetermined distance position in a longitudinal direction of the cassette label; and an adhesive member that is provided on a surface opposite to the outer surface of the label base body and that is used to adhere the cassette label to the cassette-type recording medium.

JP2005-135487A describes a recording medium cartridge comprising: a case that includes an upper case and a lower case joined to each other with their peripheral walls in contact with each other and that accommodates a recording medium, in which a recessed portion that straddles the upper case and the lower case is formed in a peripheral wall of the case, and a sealing member that is not re-attachable across the upper case and the lower case is adhered inside the recessed portion.

JP1998-144048A (JP-H10-144048A) describes a cassette label including: an integrated circuit that includes a storage unit and a signal processing unit; an antenna unit that at least transmits a signal to the integrated circuit; and a label base body that accommodates the integrated circuit and the antenna unit and that is mounted on a rear surface of a video cassette tape.

SUMMARY

One embodiment according to the technology of the present disclosure provides a magnetic tape cartridge, a magnetic tape drive system, and a magnetic tape cartridge manufacturing method capable of suppressing tampering of the magnetic tape cartridge.

According to a first aspect of the technology of the present disclosure, there is provided a magnetic tape cartridge comprising: a label that is provided on an outer surface of a case and on which an identifier is displayed, in which a marking for visually recognizing an attachment state of the label with respect to the case is applied, the marking being a mark formed across the label and the case.

According to a second aspect of the technology of the present disclosure, in the magnetic tape cartridge described in the first aspect, the marking is applied through laser marking.

According to a third aspect of the technology of the present disclosure, in the magnetic tape cartridge described in the first aspect, the identifier includes a one-dimensional image and/or a two-dimensional matrix image, and a character string, and the marking is applied across a displayed region of the character string in the label and the case.

According to a fourth aspect of the technology of the present disclosure, in the magnetic tape cartridge described in the first aspect, the label has a rectangular shape, and the marking has a linear shape intersecting each of two sides adjacent to each other in the label.

According to a fifth aspect of the technology of the present disclosure, in the magnetic tape cartridge described in the first aspect, the label has a rectangular shape, and the marking is formed in a linear shape surrounding at least any one of four corners of the label.

According to a sixth aspect of the technology of the present disclosure, in the magnetic tape cartridge described in the fifth aspect, the marking is formed in an L-like shape.

According to a seventh aspect of the technology of the present disclosure, in the magnetic tape cartridge described in the first aspect, in a case where a character string included in the identifier is denoted by a first character string, a second character string that is a character string corresponding to the first character string is displayed on the outer surface of the case outside a region where the label is attached.

According to an eighth aspect of the technology of the present disclosure, in the magnetic tape cartridge described in the seventh aspect, the second character string is displayed on a surface of the case to which the label is attached.

According to a ninth aspect of the technology of the present disclosure, in the magnetic tape cartridge described in the first aspect, the label is a security label whose trace remains in a case where the label has been peeled off.

According to a tenth aspect of the technology of the present disclosure, in the magnetic tape cartridge described in the first aspect, the label includes a non-contact communication medium in which information indicating the identifier is stored.

According to an eleventh aspect of the technology of the present disclosure, there is provided a magnetic tape drive system comprising: a processor, in which the processor is configured to: acquire a label image including an image region showing the label provided on the magnetic tape cartridge according to the first aspect; and control reading and writing processing with respect to a magnetic tape provided in the magnetic tape cartridge based on a result of determining the attachment state of the label indicated by the marking in the label image.

According to a twelfth aspect of the technology of the present disclosure, there is provided a magnetic tape cartridge manufacturing method comprising: attaching a label on which an identifier is displayed to an outer surface of a case; and applying a marking for visually recognizing an attachment state of the label with respect to the case, the marking being a mark formed across the label and the case.

BRIEF DESCRIPTION OF THE DRAWINGS

FIG. 7 is a flowchart showing an example of an attachment step of the label according to the embodiment.

FIG. 8 is a schematic perspective view showing an example of the label displayed on the magnetic tape cartridge according to the embodiment.

FIG. 9 is a schematic perspective view showing an example of the label displayed on the magnetic tape cartridge according to the embodiment.

FIG. 10 is a schematic perspective view showing an example of the label displayed on the magnetic tape cartridge according to the embodiment.

DETAILED DESCRIPTION

Figure 1:
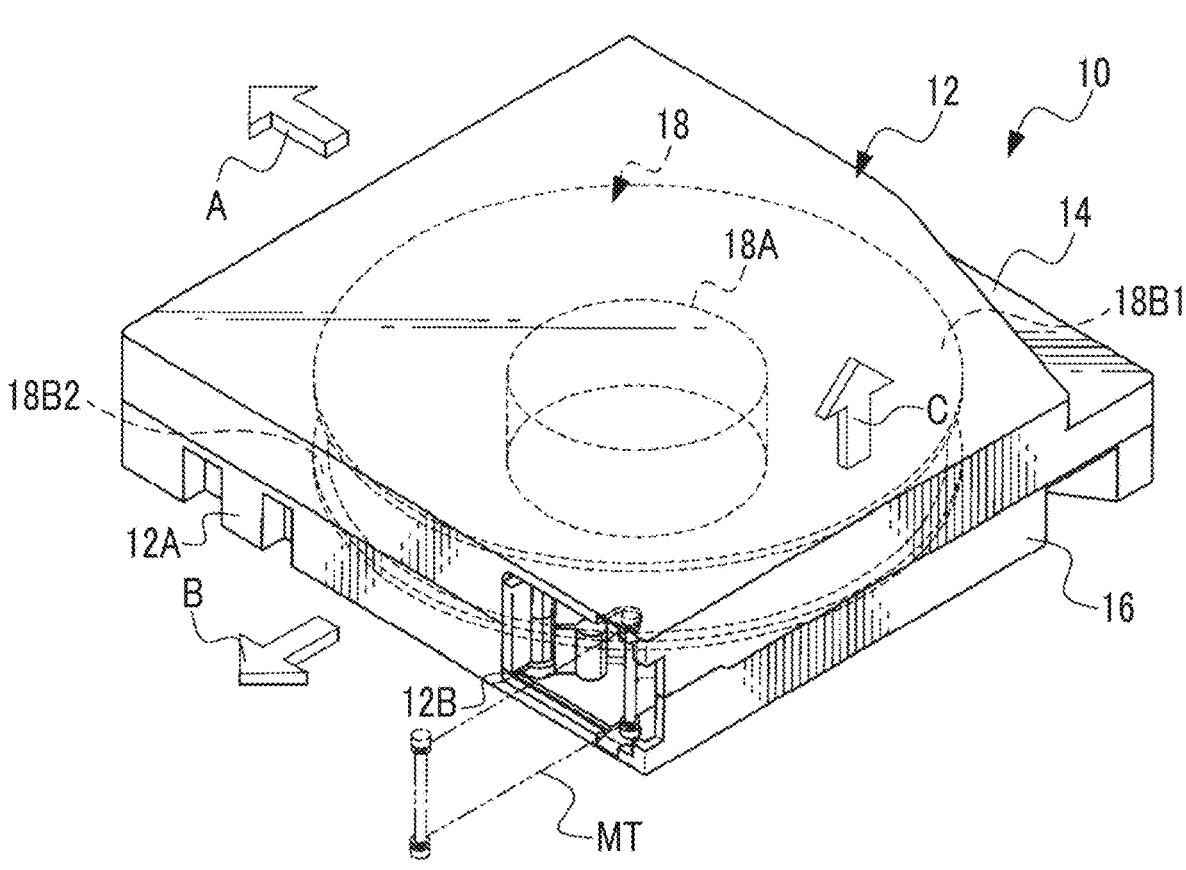
FIG. 1 is a schematic perspective view showing an example of an appearance of a magnetic tape cartridge according to an embodiment.

First, the terminology used in the following description will be described.

NVM refers to the abbreviation for "non-volatile memory". CPU refers to the abbreviation for "central processing unit". GPU refers to the abbreviation for "graphics processing unit". RAM refers to the abbreviation for "random access memory". EEPROM refers to the abbreviation for "electrically erasable and programmable read only memory". EL refers to the abbreviation for "electronic luminescent". LCD refers to the abbreviation for "liquid crystal display". SSD refers to the abbreviation for "solid state drive". HDD refers to the abbreviation for "hard disk drive". USB refers to the abbreviation for "universal serial bus". ASIC refers to the abbreviation for "application specific integrated circuit". FPGA refers to the abbreviation for "field-programmable gate array". SoC refers to the abbreviation for "system-on-a-chip". PLC refers to the abbreviation for "programmable logic controller". IC refers to the abbreviation for "integrated circuit". RFID refers to the abbreviation for "radio frequency identifier". CCD refers to the abbreviation for "charge-coupled device". LED refers to the abbreviation for "light-emitting diode". AI refers to the abbreviation for "artificial intelligence".

In the following description, for convenience of description, in FIG. 1, a direction of an arrow A is denoted as a front direction of a magnetic tape cartridge 10, and a side in the front direction of the magnetic tape cartridge 10 is denoted as a front side of the magnetic tape cartridge 10. In the following description on the structure of the magnetic tape cartridge 10, "front" refers to the front side of the magnetic tape cartridge 10.

In addition, in the following description, for convenience of description, in FIG. 1, a direction opposite to the front direction of the magnetic tape cartridge 10 is denoted as a rear direction of the magnetic tape cartridge 10, and a side in the rear direction of the magnetic tape cartridge 10 is denoted as a rear side of the magnetic tape cartridge 10. In the following description on the structure of the magnetic tape cartridge 10, "rear" refers to the rear side of the magnetic tape cartridge 10.

Further, in the following description, for convenience of description, in FIG. 1, a direction of an arrow B perpendicular to the direction of the arrow A is denoted as a right direction, and a side in the right direction of the magnetic tape cartridge 10 is denoted as a right side of the magnetic tape cartridge 10. In the following description on the structure of the magnetic tape cartridge 10, "right" indicates the right side of the magnetic tape cartridge 10.

Furthermore, in the following description, for convenience of description, in FIG. 1, a direction opposite to the right direction of the magnetic tape cartridge 10 is denoted as a left direction of the magnetic tape cartridge 10, and a side in the left direction of the magnetic tape cartridge 10 is denoted as a left side of the magnetic tape cartridge 10. In the following description on the structure of the magnetic tape cartridge 10, "left" refers to the left side of the magnetic tape cartridge 10.

In addition, in the following description, for convenience of description, in FIG. 1, a direction perpendicular to the direction of the arrow A and the direction of the arrow B is indicated by an arrow C, the direction of the arrow C is referred to as an upper direction of the magnetic tape cartridge 10, and a side in the upper direction of the magnetic tape cartridge 10 is denoted as an upper side of the magnetic tape cartridge 10. In the following description on the structure of the magnetic tape cartridge 10, "upper" refers to the upper side of the magnetic tape cartridge 10.

Moreover, in the following description, for convenience of description, in FIG. 1, a direction opposite to the upper direction of the magnetic tape cartridge 10 is denoted as a lower direction of the magnetic tape cartridge 10, and a side in the lower direction of the magnetic tape cartridge 10 is denoted as a lower side of the magnetic tape cartridge 10. In the following description on the structure of the magnetic tape cartridge 10, "lower" refers to the lower side of the magnetic tape cartridge 10.

As shown in FIG. 1 as an example, the magnetic tape cartridge 10 has a substantially rectangular shape in a plan view and comprises a box-shaped case 12. The magnetic tape cartridge 10 is an example of a "magnetic tape cartridge" according to the technology of the present disclosure. The case 12 is made of resin such as polycarbonate and comprises an upper case 14 and a lower case 16. The upper case 14 and the lower case 16 are joined to each other by welding (for example, ultrasonic welding) and screwing in a state in which a lower peripheral edge surface of the upper case 14 and an upper peripheral edge surface of the lower case 16 are brought into contact with each other. A joining method is not limited to welding and screwing, and other joining methods may be used. The case 12 is an example of a "case" according to the technology of the present disclosure.

A cartridge reel 18 is rotatably accommodated inside the case 12. The cartridge reel 18 comprises a reel hub 18A, an upper flange 18B1, and a lower flange 18B2. The reel hub 18A is formed in a cylindrical shape. The reel hub 18A is an axial center portion of the cartridge reel 18, has an axial center direction along an upper-lower direction of the case 12, and is disposed at a central portion of the case 12. Each of the upper flange 18B1 and the lower flange 18B2 is formed in an annular shape. A central portion of the upper flange 18B1 in a plan view is fixed to an upper end part of the reel hub 18A, and a central portion of the lower flange 18B2 in a plan view is fixed to a lower end part of the reel hub 18A. A magnetic tape MT is wound around an outer peripheral surface of the reel hub 18A, and widthwise end parts of the magnetic tape MT are held by the upper flange 18B1 and the lower flange 18B2. The reel hub 18A and the lower flange 18B2 may be molded integrally.

An opening 12B is formed on a rear side of a right wall 12A of the case 12. The magnetic tape MT is pulled out from the opening 12B.

Figure 2:
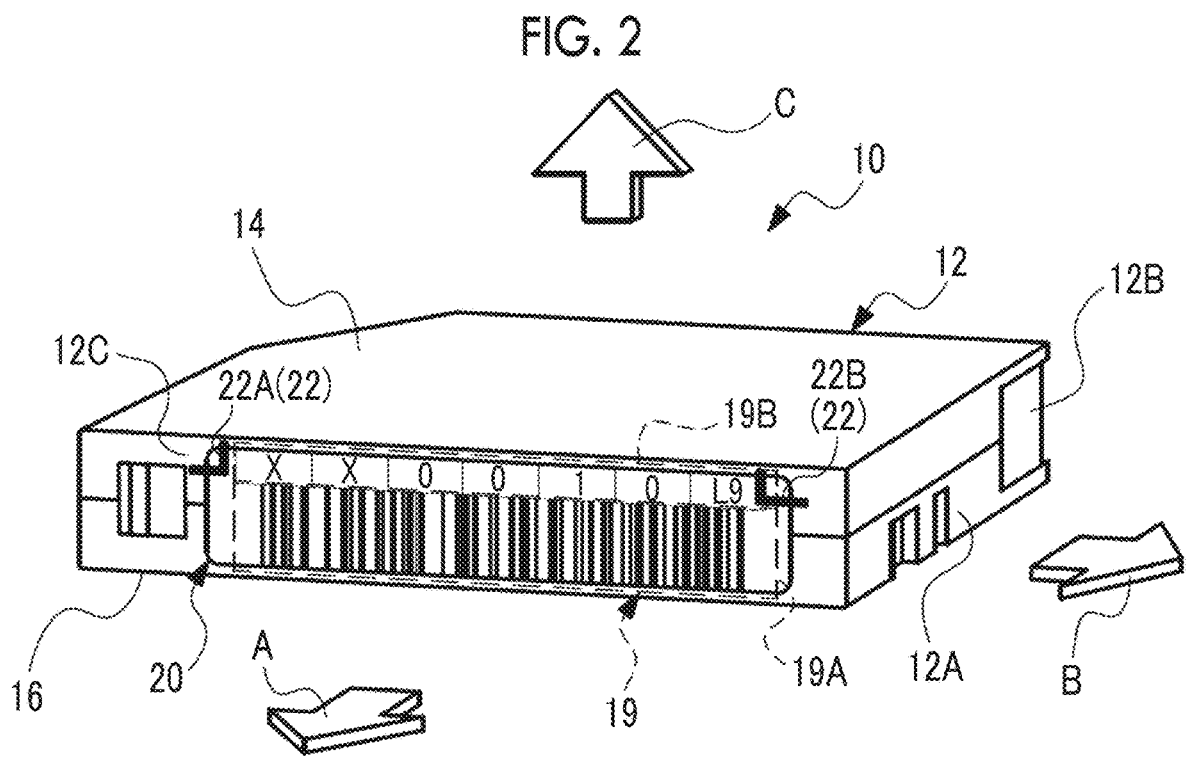
FIG. 2 is a schematic perspective view showing an example of a label displayed on the magnetic tape cartridge according to the embodiment.

As shown in FIG. 2 as an example, a label 20 is provided on an outer surface of the case 12 of the magnetic tape cartridge 10. In the example shown in FIG. 2, the label 20 is attached to an outer surface of a front wall 12C of the case 12. The label 20 has, for example, a rectangular shape. In the example shown in FIG. 2, the label 20 is a rectangle having long sides along a longitudinal direction of the front wall 12C of the case 12. The label 20 is an example of a "label" according to the technology of the present disclosure.

A material of the label 20 is not particularly limited, and the label 20 may be made of paper or resin. In addition, a coating layer may be formed on an outer surface of the label 20.

An identifier 19 is displayed on the label 20. The identifier 19 includes a barcode 19A. The barcode 19A is a one-dimensional image indicating information for identifying the magnetic tape cartridge 10 (for example, a serial number assigned by a user to manage the magnetic tape cartridge 10, or the like). The identifier 19 is an example of an "identifier" according to the technology of the present disclosure, and the barcode 19A is an example of a "one-dimensional image" according to the technology of the present disclosure.

In addition, in the example shown in FIG. 2, the identifier 19 includes a character string 19B. The character string 19B is a character string (for example, a character string including a combination of alphanumeric characters, or the like) indicating information for identifying the magnetic tape cartridge 10. By displaying the character string 19B, the user can visually identify the magnetic tape cartridge 10. The character string 19B is an example of a "character string" according to the technology of the present disclosure.

In the example shown in FIG. 2, the label 20 on which barcode 19A and the character string 19B are printed is attached to the outer surface of the case 12. Here, in the label 20, the barcode 19A and the character string 19B are printed in two rows, upper and lower parts. In the label 20, the character string 19B is printed on the upper side, and the barcode 19A is printed on the lower side.

Meanwhile, various types of information are recorded on the magnetic tape MT in the magnetic tape cartridge 10, and the information is read and written as necessary. Some of these pieces of information may include highly confidential information. In response, various means for suppressing unauthorized reading and writing of information with respect to the magnetic tape cartridge 10 are being studied. However, in the magnetic tape cartridge 10, in a case where the cartridge reel 18 around which the magnetic tape MT is wound is replaced entirely, the magnetic tape MT can be tampered with. Therefore, it is required to suppress the disassembly of the magnetic tape cartridge 10.

In a case where the magnetic tape cartridge 10 is disassembled, the label 20 attached to the case 12 may be peeled off, or the peeled label 20 may be attached again. Alternatively, the label 20 may be replaced with another label 20. In response, in the magnetic tape cartridge 10 according to the present embodiment, a marking 22 is formed across the label 20 and the case 12. The marking 22 is a mark formed across the label 20 and the case 12. That is, the marking 22 is partially formed on the case 12 across an outer edge of the label 20, and a remaining part is formed on the label 20. The marking 22 is used for the user to visually recognize an attachment state of the label 20 with respect to the case 12. In the example shown in FIG. 2, a left side marking 22A and a right side marking 22B are formed as the markings 22. The marking 22, the left side marking 22A, and the right side marking 22B are examples of a "marking" according to the technology of the present disclosure.

Figure 3:
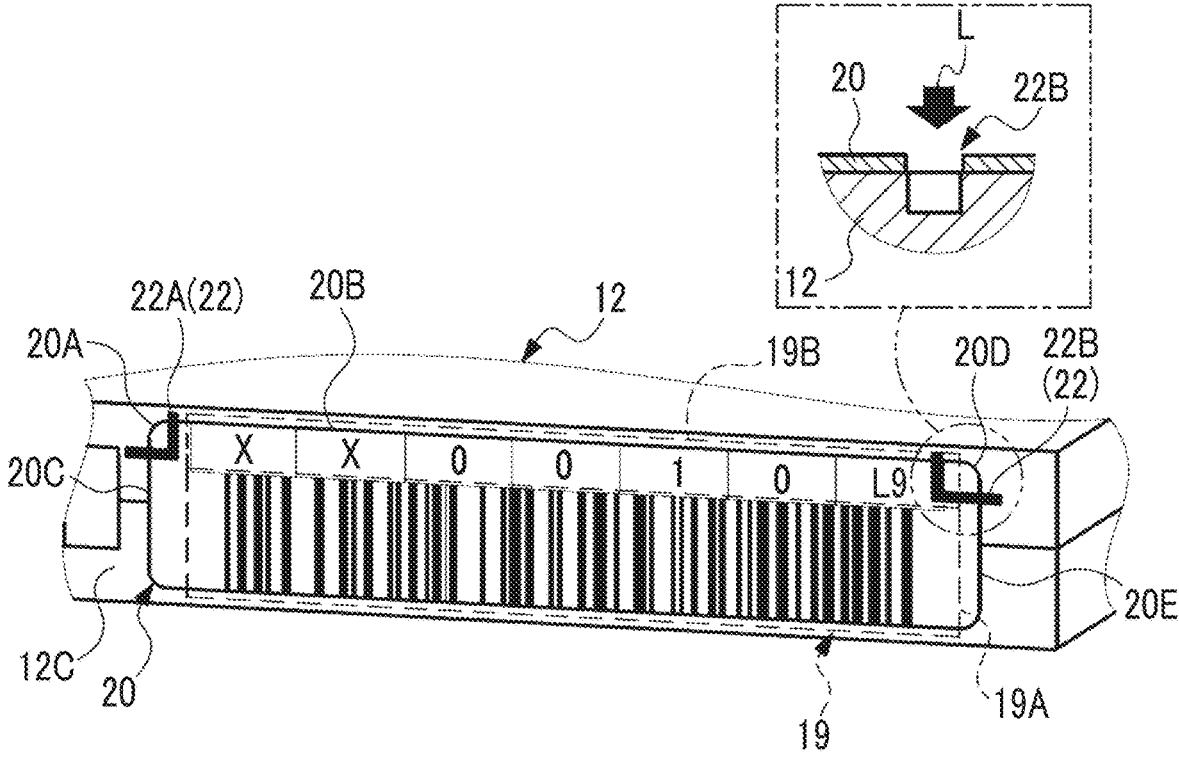
FIG. 3 is a schematic perspective view showing an example of the label displayed on the magnetic tape cartridge according to the embodiment.

As shown in FIG. 3 as an example, the left side marking 22A is formed at a position facing an upper left corner 20A of the label 20. The left side marking 22A is formed in a linear shape intersecting an upper side 20B and a left side 20C of the label 20. That is, the left side marking 22A has a linear shape intersecting each of two sides adjacent to each other in the label 20.

In addition, the left side marking 22A is formed in a linear shape surrounding the upper left corner 20A. In the example shown in FIG. 3, the left side marking 22A is formed in an L-like shape. Specifically, an L-like corner portion faces the upper left corner 20A of the label 20, and straight line portions extending from the corner portion intersect the upper side 20B and the left side 20C, respectively. Both ends of the L-like shape are located on the case 12.

The right side marking 22B is formed at a position facing an upper right corner 20D of the label 20. The right side marking 22B is formed in a linear shape intersecting the upper side 20B and a right side 20E of the label 20. That is, the right side marking 22B has a linear shape intersecting each of two sides adjacent to each other in the label 20.

In addition, the right side marking 22B is formed in a linear shape surrounding the upper right corner 20D. In the example shown in FIG. 3, the right side marking 22B is formed in an L-like shape. Specifically, an L-like corner portion faces the upper right corner 20D of the label 20, and straight line portions extending from the corner portion intersect the upper side 20B and the right side 20E, respectively. Both ends of the L-like shape are located on the case 12.

The marking 22 is formed across a region in which the character string 19B of the label 20 is displayed and the case 12. Specifically, the left side marking 22A is formed on the left side of the character string 19B, and the right side marking 22B is formed on the right side of the character string 19B. In other words, the marking 22 is not formed in a region in which the barcode 19A is displayed.

The left side marking 22A and the right side marking 22B are applied through laser marking. Specifically, the label 20 attached to the case 12 is irradiated with laser light L, and the label 20 and the case 12 are partially ablated, thereby forming a groove. Consequently, the marking 22 is applied to the outer surface of the case 12 as a laser trace. In addition, a part of the label that has been altered by the irradiation of laser light L remains within the groove.

Figure 4:
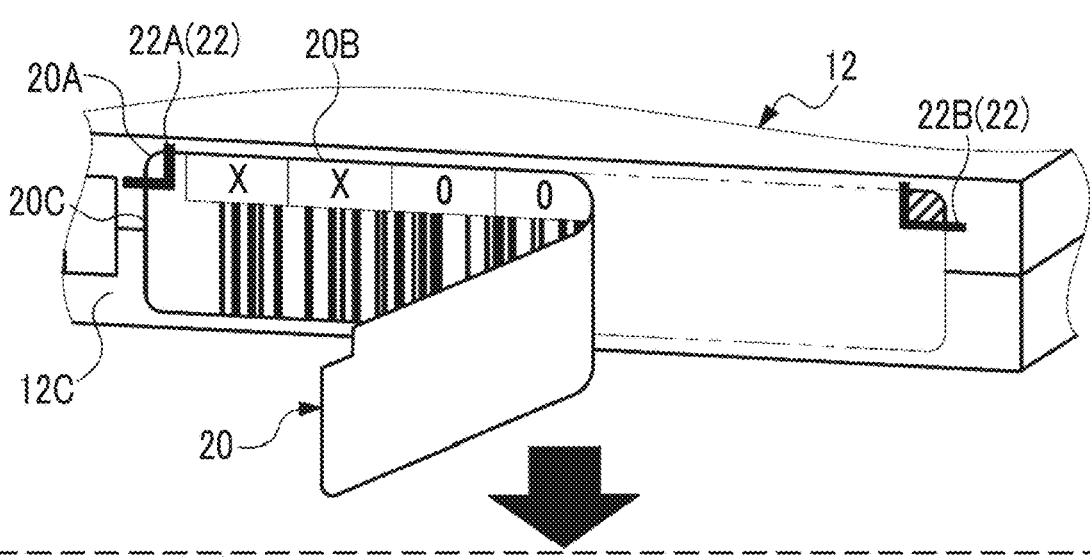
FIG. 4 is a conceptual diagram showing an example of the label displayed on the magnetic tape cartridge according to the embodiment.

As shown in FIG. 4 as an example, a case is considered in which the label 20 is peeled off from the case 12. As shown in <A> of FIG. 4, after the label 20 is peeled off, a region between the upper left corner 20A of the label 20 and the left side marking 22A remains on the case 12. In addition, a region between the upper right corner 20D of the label 20 and the right side marking 22B is left on the case 12. As a result, it can be visually recognized that the label 20 that has been attached is peeled off.

In addition, as shown in <B> of FIG. 4, a case is considered in which another label 20 is attached after the label 20 is peeled off. In this case, the marking 22 is not applied to the newly attached label 20. Therefore, the marking 22 is applied only to a case 12 side. That is, the marking 22 is not applied across the case 12 and the label 20. In the example shown in <B> of FIG. 4, a part of the L-like shaped left side marking 22A and a part of the L-like shaped right side marking 22B are left on the case 12. As a result, it can be visually recognized that another label 20 is attached after the label 20 is peeled off.

In addition, as shown in <C> of FIG. 4, a case is considered in which the same label 20 is re-attached after the label 20 is peeled off. In this case, the marking 22 is applied to the re-attached label 20, but it is difficult to re-attach the label 20 exactly to the same position as before the label 20 is peeled off. Specifically, this is because it is necessary to precisely align the position of the marking 22 on the label 20 with the position of the marking 22 on the case 12. Therefore, after the label 20 is re-attached, the marking 22 applied to the label 20 and the marking 22 applied to the case 12 are often not aligned continuously. In the example shown in <C> of FIG. 4, the positions of the marking 22 applied to the label 20 and the marking 22 applied to the case 12 deviate from each other in the upper-lower direction and the left-right direction. As a result, it can be visually recognized that the same label 20 is re-attached after the label 20 is peeled off. In this way, the attachment state of the label 20 with respect to the case 12 can be visually recognized by using the marking 22.

The visual recognition of the attachment state of the label 20 as described above is performed by the user before the magnetic tape cartridge 10 is loaded into a device (for example, a magnetic tape library). In a case where it is determined that the magnetic tape cartridge 10 may have been tampered with as a result of visually recognizing the attachment state of the label 20, the user stops using the magnetic tape cartridge 10.

In addition, the confirmation of the attachment state of the label 20 may be executed inside a device that performs reading and writing with respect to the magnetic tape cartridge 10. Hereinafter, an example will be described in which the confirmation of the attachment state of the label 20 is executed inside a magnetic tape library 32.

Figure 5:
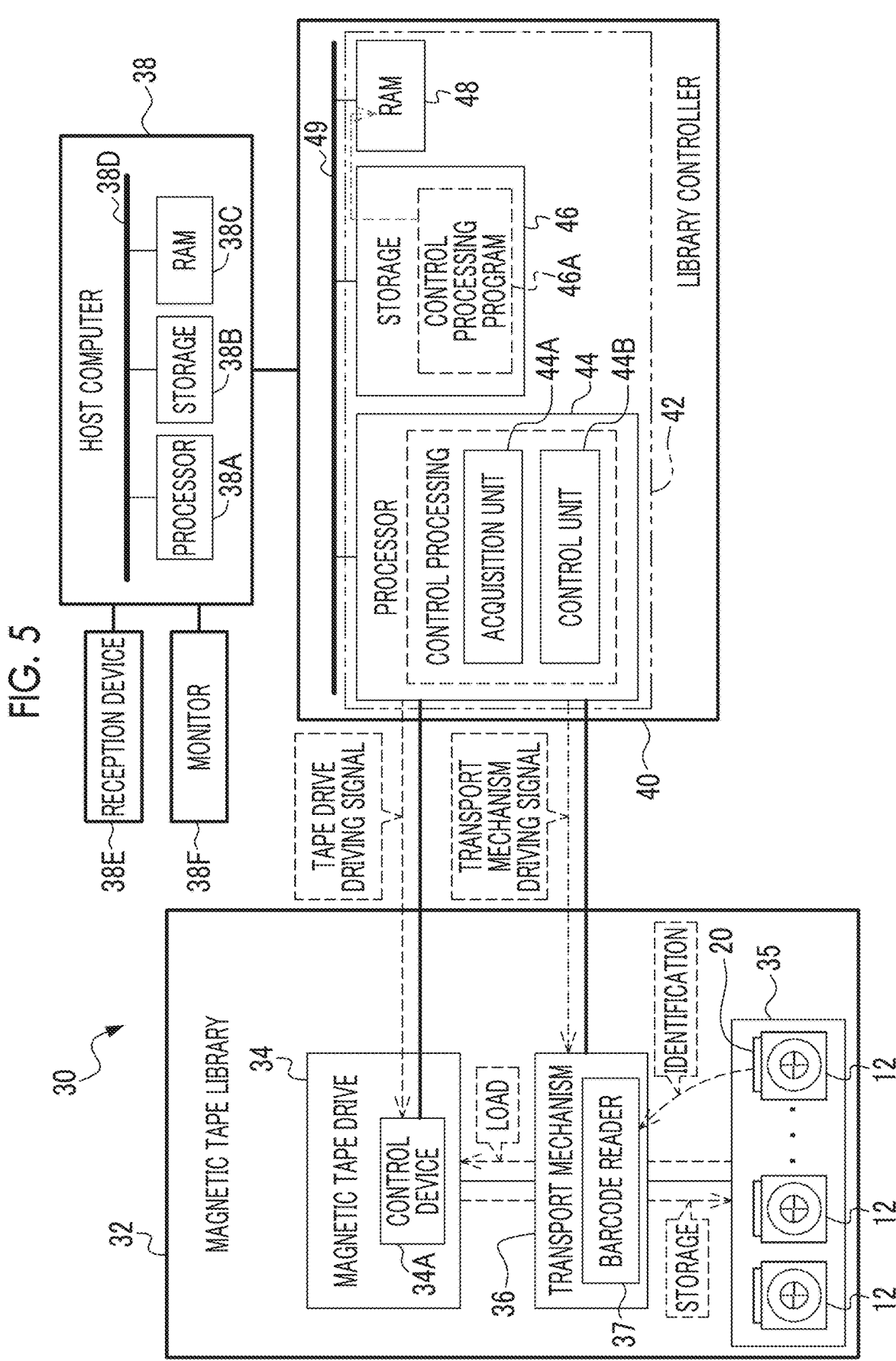
FIG. 5 is a schematic configuration diagram showing an example of a hardware configuration of a magnetic tape drive system according to the embodiment.

As shown in FIG. 5 as an example, a magnetic tape drive system 30 comprises the magnetic tape library 32, a library controller 40, and a host computer 38. The magnetic tape drive system 30 is an example of a "magnetic tape drive system" according to the technology of the present disclosure.

A plurality of the magnetic tape cartridges 10 can be stored in the magnetic tape library 32. In addition, the magnetic tape library 32 comprises one or more magnetic tape drives 34. Further, the magnetic tape library 32 is provided with a cartridge storage shelf 35 and a transport mechanism 36.

The cartridge storage shelf 35 is a shelf consisting of a plurality of cells (that is, cartridge storage cells), which are sized such that the magnetic tape cartridge 10 can be stored, and a predetermined number of magnetic tape cartridges 10, for example, one each, are stored in each cartridge storage cell. The cartridge storage cells are arranged in a grid-like shape, for example, 10 rows×5 columns. It should be noted that this is merely an example, and another arrangement method may be used.

The transport mechanism 36 transports the magnetic tape cartridge 10 between the cartridge storage cell and the magnetic tape drive 34. The transport mechanism 36 operates under the control of the library controller 40. The library controller 40 outputs a transport mechanism driving signal to the transport mechanism 36. The transport mechanism driving signal is a signal for instructing the transport mechanism 36 to drive.

The magnetic tape cartridge 10 is loaded into the magnetic tape drive 34. The library controller 40 outputs a tape drive driving signal to the magnetic tape drive 34. The tape drive driving signal is a signal for instructing the magnetic tape drive 34 to drive. The magnetic tape drive 34 performs reading of data from the magnetic tape MT accommodated in the magnetic tape cartridge 10 and writing of data to the magnetic tape MT, in accordance with the tape drive driving signal.

The library controller 40 is connected to the magnetic tape library 32 to be communicable via a communication cable. The library controller 40 comprehensively controls the transport mechanism 36 and the magnetic tape drive 34. For example, the library controller 40 controls the retrieval of the magnetic tape cartridge 10 from the cartridge storage shelf 35 and storage of the magnetic tape cartridge 10 into the cartridge storage shelf 35. The library controller 40 controls the transport of the magnetic tape cartridge 10. The library controller 40 controls the loading of the magnetic tape cartridge 10 into the magnetic tape drive 34 and the retrieval of the magnetic tape cartridge 10 from the magnetic tape drive 34. The library controller 40 controls the reading of data from the magnetic tape MT, the writing of data to the magnetic tape MT, and the like.

The host computer 38 is connected to the library controller 40 to be communicable via a communication cable. Here, wired communication is exemplified, but the present disclosure is not limited to this, and wireless communication may be used. The host computer 38 receives an instruction from the user and issues instructions to read data from the magnetic tape MT accommodated in the magnetic tape cartridge 10 and to write data to the magnetic tape MT.

The library controller 40, under the control of the host computer 38, searches for a specific magnetic tape cartridge 10 (for example, a magnetic tape cartridge 10 to be a target for data reading and writing) from a plurality of magnetic tape cartridges 10, causes the transport mechanism 36 to retrieve the specific magnetic tape cartridge 10 from the cartridge storage shelf 35, or causes the magnetic tape drive 34 to read and write data from and to the magnetic tape MT in the specific magnetic tape cartridge 10.

The library controller 40 comprises a computer 42. The computer 42 comprises a processor 44, a storage 46, and a RAM 48. The processor 44, the storage 46, and the RAM 48 are connected to a bus 49.

The processor 44 controls the entire library controller 40. The processor 44 includes, for example, a CPU and a GPU and controls the entire library controller 40. The GPU operates under the control of the CPU and executes, for example, screen display and/or image processing. The processor 44 may be one or more CPUs integrated with GPU functions or may be one or more CPUs without being integrated with GPU functions. The processor 44 is an example of a "processor" according to the technology of the present disclosure.

The storage 46 is a non-volatile storage device that stores various programs, various parameters, and the like. An example of the storage 46 includes a flash memory (for example, an EEPROM and/or an SSD). The flash memory is merely an example, and other non-volatile storage devices such as an HDD may be used or a combination of two or more types of non-volatile storage devices may be used. The RAM 48 is a volatile memory that is used as a work area or the like during the execution of various programs.

The processor 44 outputs the transport mechanism driving signal. The transport mechanism 36 selectively performs a loading operation and a storage operation in accordance with the transport mechanism driving signal input from the processor 44. The loading operation refers to an operation of retrieving the magnetic tape cartridge 10 from the cartridge storage shelf 35 and loading the magnetic tape cartridge 10 into the magnetic tape drive 34. The storage operation refers to an operation of retrieving the magnetic tape cartridge 10 from the magnetic tape drive 34 and storing the magnetic tape cartridge 10 in the original cartridge storage shelf 35.

The processor 44 outputs the tape drive driving signal. The magnetic tape drive 34 selectively performs a reading-out operation of reading out data from the magnetic tape MT and a writing operation of writing data to the magnetic tape MT in accordance with the tape drive driving signal input from the processor 44.

The host computer 38 issues an instruction corresponding to a user's request to the library controller 40. The host computer 38 comprises a processor 38A, a storage 38B, and a RAM 38C. The processor 38A controls the entire host computer 38. An example of the processor 38A includes a CPU. The storage 38B is a non-volatile memory. Various programs are stored in the storage 38B. An example of the storage 38B includes a flash memory (for example, an EEPROM and/or an SSD). The RAM 38C is a volatile memory that is used as a work area or the like during the execution of various programs.

The processor 38A, the storage 38B, and the RAM 38C are connected to a bus 38D. A reception device 38E including, for example, a mouse, a keyboard, a touch panel, and the like, and a monitor 38F, for example, an EL display, an LCD, or the like, are connected to the host computer 38. The reception device 38E receives an instruction from the user for the host computer 38. The monitor 38F displays an output from the host computer 38 on a screen. Here, although the reception device 38E and the monitor 38F are exemplified as independent devices, the technology of the present disclosure is not limited to this, and an input/output device in which the reception device 38E and the monitor 38F are integrated may be applied. Examples of the input/output device include a touch panel display in which the touch panel provided in the reception device 38E and the monitor 38F are integrated.

In the present embodiment, the processor 44 performs control processing in order to execute the visual recognition of the attachment state of the label 20 in the magnetic tape cartridge 10. A control processing program 46A is stored in the storage 46. The processor 44 executes reading control processing by reading out the control processing program 46A from the storage 46 and executing the read-out control processing program 46A on the RAM 48. The control processing is implemented by the processor 44 operating as an acquisition unit 44A and a control unit 44B.

Figure 6:
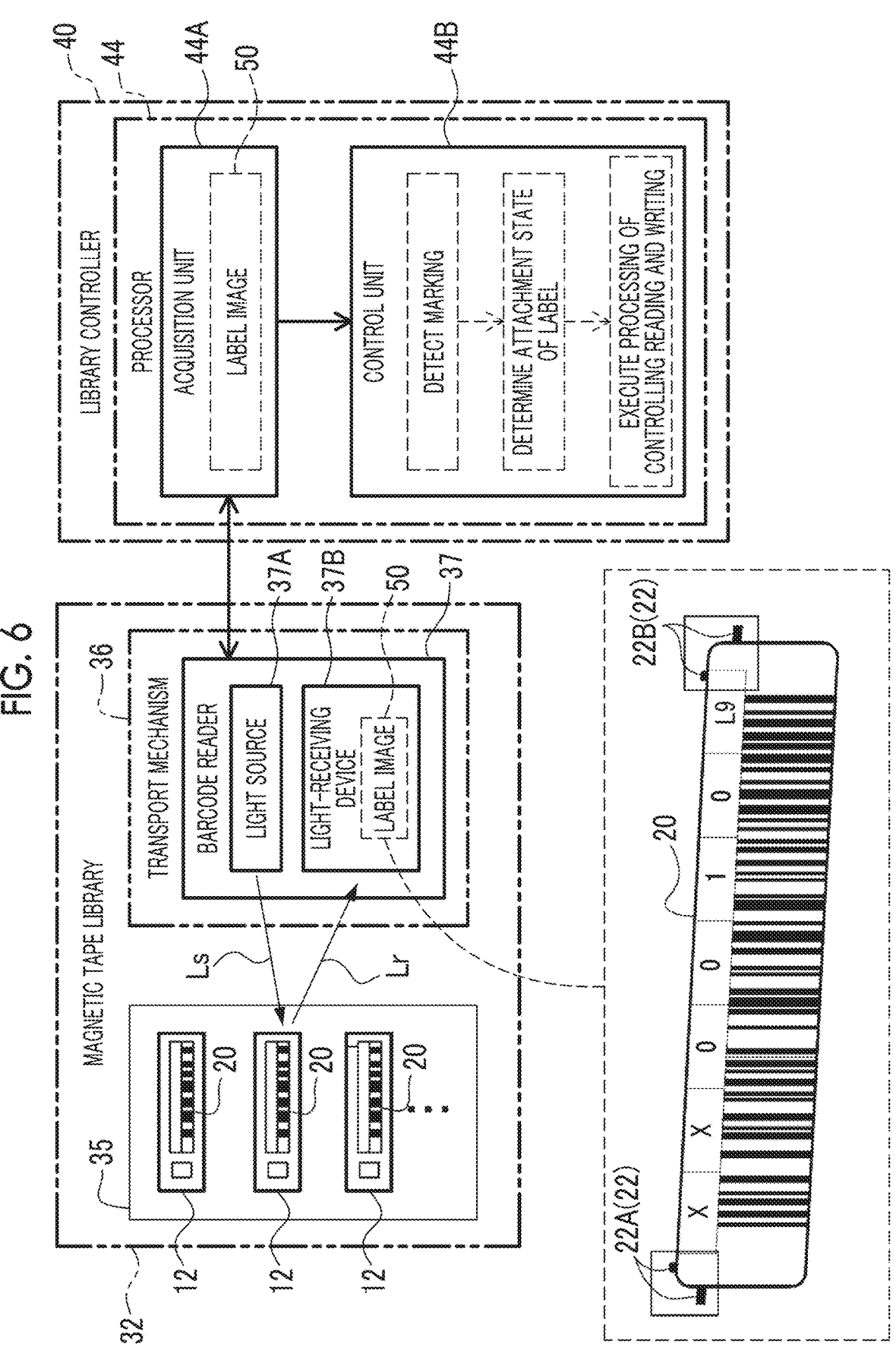
FIG. 6 is a conceptual diagram showing an example of a function of a library controller provided in the magnetic tape drive system according to the embodiment.

As shown in FIG. 6 as an example, the control unit 44B controls an optical condition in a barcode reader 37 provided in the transport mechanism 36. The barcode reader 37 is a device for reading the barcode 19A. The barcode reader 37 comprises a light source 37A and a light receiving device 37B. For example, the light receiving device 37B is an imaging device including a light receiving element. Examples of the light receiving element include a CCD image sensor. In addition, for example, the light source 37A is an LED light source that can emit infrared light.

The barcode reader 37 reads the barcode 19A displayed on the label 20 of the magnetic tape cartridge 10. Scanning light Ls emitted from the light source 37A is reflected in the barcode 19A. A part of the scanning light Ls is reflected in the barcode 19A, thereby obtaining return light Lr. The return light Lr is detected by the light receiving device 37B.

Based on a detection result in the light receiving element in the light receiving device 37B, a label image 50, which is an image showing the label 20 of the magnetic tape cartridge 10 and the periphery thereof, is generated. The label image 50 includes an image showing the label 20 and an image showing the marking 22. In the processor 44 of the library controller 40, the acquisition unit 44A acquires the label image 50 from the light receiving device 37B. Then, the control unit 44B acquires the label image 50 from the acquisition unit 44A. The label image 50 is an example of a "label image" according to the technology of the present disclosure.

The control unit 44B executes image recognition processing on the label image 50 to acquire the attachment state of the label 20 with respect to the case 12. Here, the image recognition processing may be AI-based image recognition processing or pattern matching-based image recognition processing. As a result of the image recognition processing, the control unit 44B acquires the attachment state of the label 20. In the example shown in FIG. 6, an example is shown in which an image region showing the marking 22 applied to the case 12 without the marking 22 applied to the label 20 is detected.

The control unit 44B determines the attachment state of the label 20 based on the detection result of the image region including the marking 22. The control unit 44B determines the attachment state of the label 20 by using, for example, a table (not shown) in which the detection result in the label image 50 is used as input information and the attachment state of the label 20 is used as output information. In the example shown in FIG. 6, since the marking 22 is not applied to the label 20 and the marking 22 is applied to the case 12, the control unit 44B determines that the label 20 is in an attachment state in which another label 20 is attached after the label 20 is peeled off.

It should be noted that, here, a form example has been described in which the determination of the attachment state of the label 20 is performed by using the table, but this is merely an example. The attachment state of the label 20 may be determined by using, for example, a trained model for determining the attachment state of the label 20. In this case, the trained model for determining the attachment state of the label 20 is obtained by performing machine learning with respect to a neural network using data indicating the attachment state of the label 20 as correct answer data and a plurality of label images 50 as example data.

The control unit 44B controls reading and writing of information with respect to the magnetic tape MT in the magnetic tape drive 34 based on the determined attachment state of the label 20. For example, the control unit 44B executes control of prohibiting the reading and writing of information with respect to the magnetic tape MT in a case where the attachment state of the label 20 is a state in which another label 20 is attached after the label 20 is peeled off. Specifically, the control unit 44B outputs a signal for prohibiting reading and writing with respect to the magnetic tape MT to the magnetic tape drive 34. As a result, it is impossible to use the magnetic tape cartridge 10 that may have been tampered with.

In addition, as another example of the control by the control unit 44B, control of prohibiting reading and writing of information with respect to the magnetic tape MT may be executed even in a case where the attachment state of the label 20 is a state in which the same label 20 is re-attached after the label 20 is peeled off. Further, in addition to the control of prohibiting reading and writing with respect to the magnetic tape MT, control of not transporting the magnetic tape cartridge 10 or control of notifying the user that the magnetic tape cartridge 10 may have been disassembled may be performed.

Next, an attachment step of the label 20 (hereinafter, also simply referred to as an "attachment step") in the present embodiment will be described with reference to FIG. 7. FIG. 7 shows an example of the attachment step in the present embodiment. The attachment step is executed as a part of the manufacturing step of the magnetic tape cartridge 10. The attachment step shown in FIG. 7 is an example of a "magnetic tape cartridge manufacturing method" according to the technology of the present disclosure.

In the attachment step shown in FIG. 7 as an example, first, in step ST10, the label 20 is attached to the case 12 of the magnetic tape cartridge 10. After this, the attachment step proceeds to step ST12.

In step ST12, a marking is applied to the magnetic tape cartridge 10 across the label 20 and the case 12. For example, the L-like shaped markings 22 are formed at a position facing the upper left corner 20A of the label 20 and a position facing the upper right corner 20D of the label 20, respectively. As a result, the attachment step ends.

As described above, in the magnetic tape cartridge 10 according to the present embodiment, the label 20 is provided on the outer surface of the case 12. The identifier 19 is displayed on the label 20. The marking 22 for visually recognizing the attachment state of the label 20 is applied across the label 20 and the case 12. Consequently, in a case where the label 20 is peeled off or the label 20 is replaced with another label, changes in the marking 22 occur, so that the user can easily visually recognize the attachment state of the label 20. In a case of disassembling the magnetic tape cartridge 10 to tamper with the magnetic tape cartridge 10, it is anticipated that the label 20 is replaced. In the present configuration, since the attachment state of the label 20 can be recognized, there is a psychological deterrent effect against a person who attempts to tamper with the magnetic tape cartridge 10 through disassembly, and the tampering of the magnetic tape cartridge 10 can be suppressed.

For example, the environments in which the magnetic tape cartridge 10 is used vary widely from places with high concern for information security such as data centers, government agencies, or large corporations to individuals or places with relatively low concern such as relatively small businesses. Therefore, users vary in their awareness of the risk of disassembly and tampering of the magnetic tape cartridge 10. In the present configuration, by applying the marking 22, the tampering of the magnetic tape cartridge 10 can be suppressed, so that the information security function of the magnetic tape cartridge 10 tailored to the user's needs can be provided. That is, the security level can be changed by selecting the presence or absence of the marking 22 at the manufacturing stage according to the user's needs.

In addition, in the magnetic tape cartridge 10 according to the present embodiment, the marking 22 is applied through laser marking. Consequently, with the laser marking, a part of the label 20 remains within the groove formed in the case 12 by the laser, making it easier to find that the label 20 has been peeled off. For example, in a case where the marking 22 is only printed on the label 20 and the outer surface of the case 12, the marking 22 may be removed by wiping off the paint or lightly sanding the outer surface. In the present configuration, since the groove is formed by the laser marking and a part (for example, an altered component of the label 20) of the label 20 remains within the groove, it is difficult to remove the marking 22. Therefore, there is a psychological deterrent effect against a person who attempts to tamper with the magnetic tape cartridge 10 through disassembly, and the tampering of the magnetic tape cartridge 10 can be further suppressed.

In addition, in the magnetic tape cartridge 10 according to the present embodiment, the identifier 19 displayed on the label 20 includes the barcode 19A and the character string 19B. In the label 20, the marking 22 is applied across the displayed region of the character string 19B and the case 12. Consequently, since the marking 22 is applied to a printed region of the character string 19B, the influence on the reading of the barcode 19A can be reduced. That is, in a case where the marking 22 is applied to a region in which the barcode 19A is displayed, the marking 22 may be recognized as a part of the barcode 19A, potentially leading to occurrence of a reading failure of the barcode 19A. In the present configuration, since the marking 22 is applied to the displayed region of the character string 19B, the occurrence of the reading failure of the barcode 19A can be suppressed.

In addition, in the magnetic tape cartridge 10 according to the present embodiment, the label 20 has a rectangular shape, and the marking 22 has a linear shape intersecting each of two sides adjacent to each other in the label 20. Consequently, in a case where the label 20 is replaced with another label, it is easier to find changes in the attachment position of the label 20 toward the upper-lower and left-right sides. As a result, the attachment state of the label can be easily visually recognized.

In addition, in the magnetic tape cartridge 10 according to the present embodiment, the label 20 has a rectangular shape, and the marking 22 is formed in a linear shape surrounding at least any one of four corners of the label 20. Since the marking 22 is made in a linear shape surrounding the corner of the label 20, it is easier to find changes in the attachment position of the label 20 toward the upper-lower and left-right sides in a case where the label 20 is replaced. Further, even in a case where the label 20 is peeled off, a region including the corner of the label 20 remains on the case 12, making it easier to find that the label 20 has been peeled off. As a result, the attachment state of the label can be easily visually recognized.

In addition, in the magnetic tape cartridge 10 according to the present embodiment, the marking 22 is formed in an L-like shape. Since the marking 22 is formed in an L-like shape, for example, a distance in which the marking 22 is formed can be made longer as compared with a case where the marking 22 is a single straight line, making it easier to visually recognize the marking 22. Further, in a case where the marking 22 is formed by the laser marking, a part of the label 20 remains more within a laser trace (for example, a groove), making it easier to visually recognize the attachment state of the label 20.

In addition, in the magnetic tape drive system 30 according to the present embodiment, the acquisition unit 44A of the processor 44 of the library controller 40 acquires the label image 50. The control unit 44B executes the image recognition processing on the label image 50 and determines the attachment state of the label 20 based on the result of the image recognition processing. Then, the control unit 44B controls reading and writing with respect to the magnetic tape MT provided in the magnetic tape cartridge 10 according to the attachment state of the label 20. The fact that the label 20 has been replaced means that the magnetic tape cartridge 10 may have been disassembled and that the magnetic tape MT may have been tampered with. Therefore, the attachment state of the label 20 is determined, and the reading and writing with respect to the magnetic tape MT is controlled according to the determination result. As a result, it is possible to restrict the use of the magnetic tape cartridge 10 that may have been tampered with.

In the above-described embodiment, a form example has been described in which the attachment state of the label 20 is recognized inside the magnetic tape library 32 in the magnetic tape drive system 30, but the technology of the present disclosure is not limited to this. For example, an aspect may be employed in which the attachment state of the label 20 is recognized inside the individual magnetic tape drive 34 having no library function. In this case, the magnetic tape drive 34 is an example of a "magnetic tape drive system" according to the technology of the present disclosure.

First Modification Example

In the above-described embodiment, a form example has been described in which the marking 22 is formed in the magnetic tape cartridge 10, but the technology of the present disclosure is not limited to this. In the present first modification example, a case character string 24 is displayed on the outer surface of the case 12 outside a region where the label 20 is attached, together with the marking 22.

As shown in FIG. 8 as an example, the identifier 19 displayed on the label 20 includes the character string 19B. Hereinafter, in the description of the present modification example, for convenience of description, the character string 19B is referred to as a label character string 19B.

On the case 12, the case character string 24 is displayed outside the region where the label 20 is attached. The case character string 24 is a character string displayed on the case 12 and indicates the content corresponding to the label character string 19B. The label character string 19B is an example of a "first character string" according to the technology of the present disclosure, and the case character string 24 is an example of a "second character string" according to the technology of the present disclosure.

Specifically, the case character string 24 indicates the same content as the label character string 19B. Being the same content as the label character string 19B includes being an exactly identical content to the label character string 19B and further includes being a content for enabling the individual identification of the magnetic tape cartridge 10 to the same extent as the label character string 19B.

In addition, the case character string 24 may indicate a content in which a part of the label character string 19B is omitted or a content in which a part of the label character string 19B is added, or may indicate another character string obtained by converting the label character string 19B.

Here, in the front wall 12C of the case 12, the case character string 24 is printed in vertical writing in a right-side region of the label 20. That is, the case character string 24 is displayed on the surface to which the label 20 is attached.

The display means of the case character string 24 is not particularly limited, and the case character string 24 may be printed by spraying a paint on the case 12, or the case character string 24 may be engraved through laser marking or the like.

As described above, in the magnetic tape cartridge 10 according to the present first modification example, the case character string 24 is displayed on the outer surface of the case 12 outside the region where the label 20 is attached. Consequently, by comparing the case character string 24 printed on the case 12 with the label character string 19B displayed on the label 20, it is easier for the user to find that the label 20 has been replaced. That is, it is difficult to rewrite the case character string 24 printed on the outer surface of the case 12 even in a case where the label 20 is replaced. Therefore, in a case where the case character string 24 and the label character string 19B are mismatched, it is possible to find that the label 20 has been replaced.

In addition, in the magnetic tape cartridge 10 according to the present first modification example, the case character string 24 is printed on the front wall 12C, which is the surface to which the label 20 is attached. As a result, the user can easily compare the case character string 24 with the label character string 19B at a glance, making it easier for the user to find that the label 20 has been replaced.

In addition, in the above-described first modification example, a form example has been described in which the case character string 24 is printed on the front wall 12C of the case 12, but the technology of the present disclosure is not limited to this. The case character string 24 may be displayed on an upper surface and/or a lower surface of the case 12 together with the front wall 12C of the case 12 or instead of the front wall 12C.

Second Modification Example

In the above-described embodiment, a form example has been described in which the marking 22 is formed in the magnetic tape cartridge 10, but the technology of the present disclosure is not limited to this. In the present second modification example, the marking 22 is formed, and a security label 26 is used as the label 20.

As shown in FIG. 9 as an example, the barcode 19A and the character string 19B are displayed on the security label 26 as the identifiers 19. On the case 12, the marking 22 is applied across the security label 26 and the case 12. In a case where the security label 26 is peeled off, a trace of the peeling-off remains in a region where the security label 26 has been attached. In the example shown in FIG. 9, after the security label 26 is peeled off, a pressure sensitive adhesive 26A is left as characters "OPEN VOID" in the region where the security label 26 has been attached. In this way, the trace of the peeled-off security label 26 remains on the case 12. By visually recognizing the trace of the peeled-off security label 26, the user can understand that the security label 26 has been peeled off. The security label 26 is an example of a "security label" according to the technology of the present disclosure.

In addition, in a case where the security label 26 is peeled off, the marking 22 also remains on the case 12 as described above, together with the trace of the peeled-off security label 26. In particular, in a case where the marking 22 is in an L-like shape and is formed at a position facing a corner of the security label 26, a part of the security label 26 also remains. In the example shown in FIG. 9, a region partitioned by the upper right corner 20D of the security label 26 and the right side marking 22B is left. By visually recognizing the marking 22 together with the trace of the peeled-off security label 26, the user can understand that the security label 26 has been peeled off.

As described above, in the magnetic tape cartridge 10 according to the present second modification example, the security label 26 whose trace remains in a case where the label 20 has been peeled off is used as the label 20. As a result, it is easier for the user to find that the label 20 has been peeled off.

Third Modification Example

In the above-described embodiment, a form example has been described in which the marking 22 is formed in the magnetic tape cartridge 10, but the technology of the present disclosure is not limited to this. In the present third modification example, the marking 22 is formed, and the label 20 comprises a non-contact communication medium 28.

Figure 10:
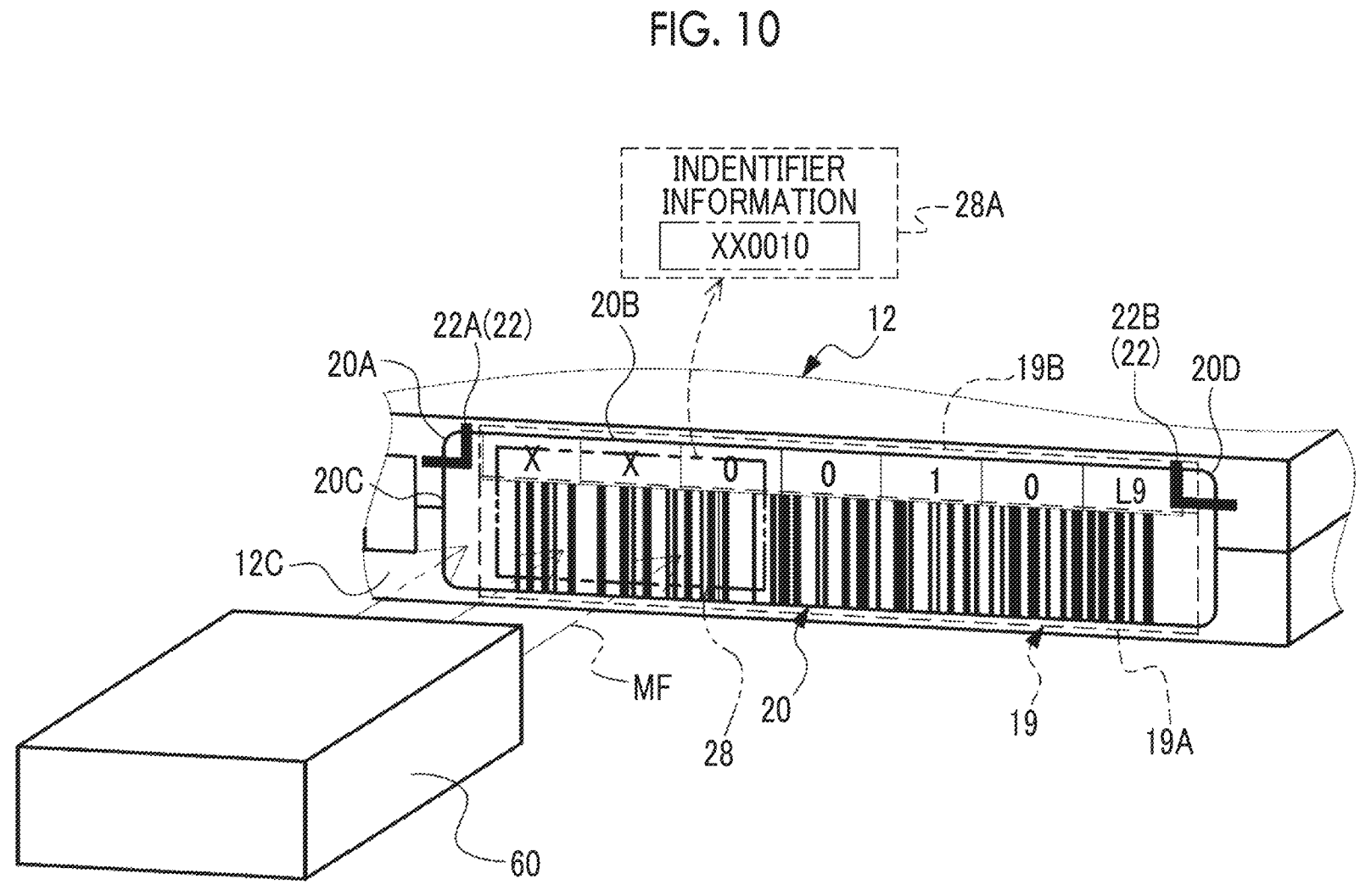

As shown in FIG. 10 as an example, the barcode 19A and the character string 19B are displayed on the label 20 as the identifiers 19. On the case 12, the marking 22 is applied across the label 20 and the case 12.

The label 20 comprises the non-contact communication medium 28. The non-contact communication medium 28 is embedded in the label 20. An IC chip (not shown) including an NVM is mounted in the non-contact communication medium 28. In the present embodiment, a so-called passive type RFID tag is employed as the non-contact communication medium 28, and various types of information are read from and written to the non-contact communication medium 28 in a non-contact manner. The non-contact communication medium 28 is an example of a "non-contact communication medium" according to the technology of the present disclosure.

A non-contact reading and writing device 60 is disposed to directly face the front wall 12C of the magnetic tape cartridge 10 and performs reading and writing of information with respect to the non-contact communication medium 28 in a non-contact manner. The non-contact reading and writing device 60 emits a magnetic field MF toward the non-contact communication medium 28. The magnetic field MF penetrates the non-contact communication medium 28.

The non-contact reading and writing device 60 performs non-contact communication with the non-contact communication medium 28 via the magnetic field MF to perform processing corresponding to a control signal with respect to the non-contact communication medium 28. For example, the non-contact reading and writing device 60 selectively performs processing of reading information from the non-contact communication medium 28 and processing of storing information in the non-contact communication medium 28 (that is, processing of writing information to the non-contact communication medium 28).

Here, the non-contact reading and writing device 60 may be a handy type RFID tag reader/writer or may be an RFID tag reader/writer mounted in the magnetic tape library 32 or the magnetic tape drive 34.

The non-contact communication medium 28 stores identifier information 28A indicating the identifier 19 displayed on the label 20. The identifier information is acquired from the non-contact communication medium 28 via the non-contact reading and writing device 60, and the attachment state of the label 20 is confirmed based on the identifier information. That is, in a case where the identifier 19 displayed on the label 20 attached to the case 12 and the identifier 19 indicated by the identifier information 28A are mismatched, it can be determined that there is a high possibility that the label 20 has been peeled off. Further, in a case where there is a change in the marking 22, it can be determined that there is a higher possibility that the label 20 has been peeled off.

As described above, in the magnetic tape cartridge 10 according to the present third modification example, the label 20 comprises the non-contact communication medium 28 in which the identifier information 28A is stored. As a result, the label 20 can be individually identified by using the non-contact communication medium 28, making it easier for the user to find that the label 20 has been replaced.

In the embodiment and each modification example described above, an aspect has been described as an example in which the barcode 19A is displayed as the identifier 19, but the technology of the present disclosure is not limited to this. In the present fourth modification example, a two-dimensional matrix image 19C is displayed as the identifier 19 instead of the barcode 19A.

Figure 11:
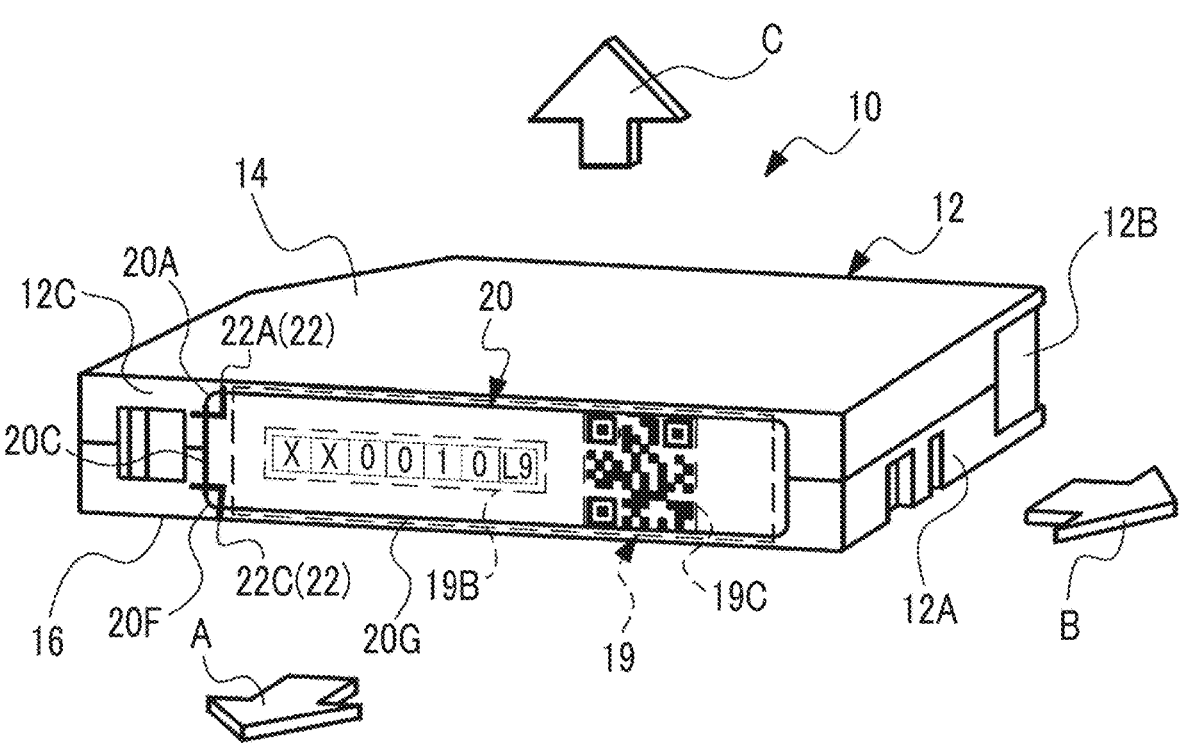
FIG. 11 is a schematic perspective view showing an example of the label displayed on the magnetic tape cartridge according to the embodiment.

As shown in FIG. 11 as an example, the label 20 is provided on the outer surface of the case 12 of the magnetic tape cartridge 10. On the case 12, the marking 22 is applied across the label 20 and the case 12.

The identifier 19 is displayed on the label 20. In the example shown in FIG. 11, the identifier 19 is displayed on the outer surface of the front wall 12C of the case 12. In addition, the identifier 19 includes the character string 19B and the two-dimensional matrix image 19C. The two-dimensional matrix image 19C is a two-dimensional image indicating information for identifying the magnetic tape cartridge 10 (for example, a serial number assigned by the user to manage the magnetic tape cartridge 10, or the like). The two-dimensional matrix image 19C is an example of a "two-dimensional matrix image" according to the technology of the present disclosure.

In the example shown in FIG. 11, the label 20 includes the left side marking 22A and a lower side marking 22C applied as the markings 22. The lower side marking 22C is formed at a position facing a lower left corner 20F of the label 20. The lower side marking 22C is formed in a linear shape intersecting a lower side 20G and the left side 20C of the label 20. That is, the lower side marking 22C has a linear shape intersecting each of two sides adjacent to each other in the label 20. In the example shown in FIG. 11, the lower side marking 22C is formed in an L-like shape.

The marking 22 is formed in a region in which the character string 19B of the label 20 is displayed. Specifically, the left side marking 22A and the lower side marking 22C are formed on the left side of the character string 19B. In other words, the marking 22 is not formed in a region in which the two-dimensional matrix image 19C is displayed.

As described above, in the magnetic tape cartridge 10 according to the present modification example, the identifier 19 includes the character string 19B and the two-dimensional matrix image 19C. In addition, the lower side marking 22C is formed in the region in which the character string 19B is displayed. As a result, since the marking 22 is applied to the printed region of the character string 19B, the influence on the reading of the two-dimensional matrix image 19C can be reduced.

Figure 12:
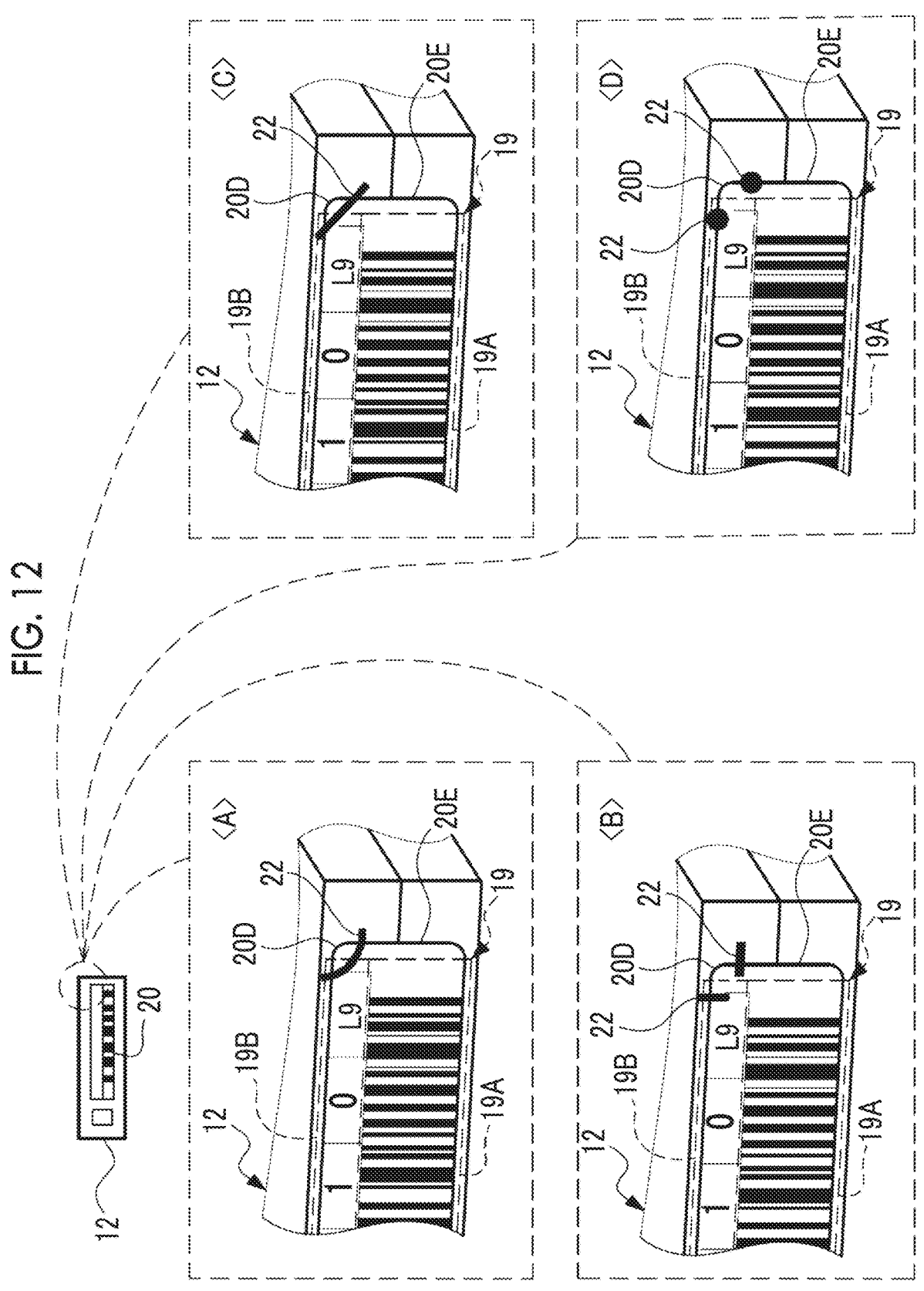
FIG. 12 is a schematic perspective view showing an example of the label displayed on the magnetic tape cartridge according to the embodiment.

In the embodiment and each modification example described above, an example of the L-like shaped marking 22 has been described as the marking 22, but the technology of the present disclosure is not limited to this. The marking 22 may be arc-shaped as shown in <A> of FIG. 12 as an example, may be a line segment intersecting each side of the label 20 as shown in <B> of FIG. 12, or may be a straight line drawn to cut the corner of the label 20 as shown in <C> of FIG. 12. In addition, the marking 22 need not have a linear shape and may be a circular mark as shown in <D> of FIG. 12 as an example. Examples of other marks include a geometrical shape such as a cross or a polygon, an illustration, or a mark such as a logo (for example, a company name or a product name).

Further, the length, the size, the number, and the disposition of the marking 22 can be appropriately set from the viewpoint of the productivity of the magnetic tape cartridge 10 and the visibility of the marking 22.

In the present modification example, a form example has been described in which the identifier 19 includes the two-dimensional matrix image 19C, but the technology of the present disclosure is not limited to this. For example, an aspect may be employed in which the identifier 19 includes the barcode 19A together with the two-dimensional matrix image 19C. Alternatively, an aspect may be employed in which the identifier 19 includes a dot code instead of the two-dimensional matrix image 19C and the barcode 19A or together with the two-dimensional matrix image 19C and the barcode 19A.

In the above-described embodiment, a form example has been described in which the magnetic tape drive system 30 comprises the magnetic tape library 32, the library controller 40, and the host computer 38, but the technology of the present disclosure is not limited to this. An aspect may be employed in which the magnetic tape library 32 is controlled by a single external control device having the same functions as the host computer 38 and the library controller 40. Alternatively, an aspect may be employed in which the magnetic tape library 32 comprises a single control device having the same functions as the host computer 38 and the library controller 40.

In addition, in the above-described embodiment, a form example has been described in which the control processing program 46A is stored in the storage 46, but the technology of the present disclosure is not limited to this. For example, the control processing program 46A may be stored in a portable storage medium such as an SSD or a USB memory. The storage medium is a non-transitory computer readable storage medium. The control processing program 46A stored in the storage medium is installed on the computer 42 of the library controller 40. The processor 44 executes the reading control processing in accordance with the control processing program 46A.

In addition, in the above-described embodiment, the computer 42 is exemplified, but the technology of the present disclosure is not limited to this, and a device including an ASIC, an FPGA, and/or a PLD may be applied, instead of the computer 42. Further, a combination of a hardware configuration and a software configuration may be used, instead of the computer 42.

In addition, as the hardware resource for executing the control processing described in each embodiment described above, various processors to be described below can be used. Examples of the processors include a CPU which is a general-purpose processor that executes, for example, software, that is, programs, to function as the hardware resource for executing the control processing. Additionally, examples of the processor include a dedicated electronic circuit which is a processor having a circuit configuration specifically designed to execute specific processing, such as an FPGA, a PLD, or an ASIC. All the processors include memories incorporated or connected, and all the processors execute the control processing by using the memories.

The hardware resource for executing the control processing may be configured with one of the various processors or may be configured with a combination of two or more processors (for example, a combination of a plurality of FPGAs or a combination of a CPU and an FPGA) of the same type or different types. Further, the hardware resource for executing the control processing may be a single processor.

As an example in which the hardware resource is configured with a single processor, first, there is a form in which a single processor is configured with a combination of one or more CPUs and software and the processor functions as the hardware resource for executing the control processing. Secondly, there is a form in which a processor that uses a single IC chip to implement functions of the entire system including a plurality of hardware resources for executing the control processing is used, as typified by SoC or the like. In this way, the control processing is implemented by using one or more of the various processors described above as the hardware resource.

The contents described and shown above are detailed descriptions of parts relating to the technology of the present disclosure and are merely examples of the technology of the present disclosure. For example, the above descriptions relating to configurations, functions, actions, and effects are descriptions relating to an example of the configurations, functions, actions, and effects of the parts relating to the technology of the present disclosure. Accordingly, it goes without saying that unnecessary parts may be deleted, new elements may be added, or replacements may be made for the contents described and shown above within the scope that does not depart from the gist of the technology of the present disclosure. Moreover, in order to avoid confusion and facilitate understanding of the parts relating to the technology of the present disclosure, descriptions relating to common technical knowledge and the like that do not require particular descriptions to enable implementation of the technology of the present disclosure are omitted from the contents described and shown above.

In the present specification, "A and/or B" is synonymous with "at least one of A or B". That is, "A and/or B" means that only A may be used, only B may be used, or a combination of A and B may be used. In addition, in the present specification, in a case where three or more matters linked by "and/or" are expressed, the same concept as "A and/or B" is applied.

All documents, patent applications, and technical standards described in the present specification are incorporated by reference into the present specification to the same extent as in a case where the individual documents, patent applications, and technical standards were specifically and individually stated to be incorporated by reference.

With regard to the above-described embodiment, further disclosure is provided as follows.

APPENDIX 1

A magnetic tape cartridge comprising:
a label that is provided on an outer surface of a case and on which an identifier is displayed,
in which a marking for visually recognizing an attachment state of the label with respect to the case is applied, the marking being a mark formed across the label and the case.

APPENDIX 2

The magnetic tape cartridge according to Appendix 1,
in which the marking is applied through laser marking.

APPENDIX 3

The magnetic tape cartridge according to Appendix 1 or 2,
in which the identifier includes a one-dimensional image and/or a two-dimensional matrix image, and a character string, and
the marking is applied across a displayed region of the character string in the label and the case.

APPENDIX 4

The magnetic tape cartridge according to any one of Appendices 1 to 3,
in which the label has a rectangular shape, and
the marking has a linear shape intersecting each of two sides adjacent to each other in the label.

APPENDIX 5

The magnetic tape cartridge according to any one of Appendices 1 to 4,
in which the label has a rectangular shape, and
the marking is formed in a linear shape surrounding at least any one of four corners of the label.

APPENDIX 6

The magnetic tape cartridge according to Appendix 5,
in which the marking is formed in an L-like shape.

APPENDIX 7

The magnetic tape cartridge according to any one of Appendices 1 to 6,
in which, in a case where a character string included in the identifier is denoted by a first character string,
a second character string that is a character string corresponding to the first character string is displayed on the outer surface of the case outside a region where the label is attached.

APPENDIX 8

The magnetic tape cartridge according to Appendix 7,
in which the second character string is displayed on a surface of the case to which the label is attached.

APPENDIX 9

The magnetic tape cartridge according to any one of Appendices 1 to 8,
in which the label is a security label whose trace remains in a case where the label has been peeled off.

APPENDIX 10

The magnetic tape cartridge according to any one of Appendices 1 to 9,
in which the label includes a non-contact communication medium in which information indicating the identifier is stored.

APPENDIX 11

A magnetic tape drive system comprising:
a processor,
in which the processor is configured to:
acquire a label image including an image region showing the label provided on the magnetic tape cartridge according to any one of Appendices 1 to 10; and
control reading and writing processing with respect to a magnetic tape provided in the magnetic tape cartridge based on a result of determining the attachment state of the label indicated by the marking in the label image.

What is claimed is:

1. A magnetic tape cartridge comprising:
a label that is provided on a flat outer surface of a case and on which an identifier is displayed,
wherein a marking for visually recognizing an attachment state of the label with respect to the case is applied, the marking, as viewed from a front side of the flat outer surface of the case, being a mark formed from a surface of the label across to the flat outer surface of a first region of the case where the label is not provided.

2. The magnetic tape cartridge according to claim 1,
wherein the marking is applied through laser marking.

3. The magnetic tape cartridge according to claim 1,
wherein the identifier includes a one-dimensional image and/or a two-dimensional matrix image, and a character string, and
the marking is applied across a displayed region of the character string in the label and the case.

4. The magnetic tape cartridge according to claim 1,
wherein the label has a rectangular shape, and
the marking has a shape with two line segments connected to each other, which respectively intersect, perpendicularly, two adjacent sides of the label.

5. The magnetic tape cartridge according to claim 1,
wherein the label has a rectangular shape, and
the marking is formed in a linear shape surrounding at least any one of four corners of the label.

6. The magnetic tape cartridge according to claim 5,
wherein the marking is formed in an L-like shape.

7. The magnetic tape cartridge according to claim 1,
wherein, in a case where a character string included in the identifier is denoted by a first character string,
a second character string that is a character string corresponding to the first character string is displayed on the outer surface of the case outside a region where the label is attached.

8. The magnetic tape cartridge according to claim 7,
wherein the second character string is displayed on a surface of the case to which the label is attached.

9. The magnetic tape cartridge according to claim 1, wherein the label is a security label whose trace remains in a case where the label has been peeled off.

10. The magnetic tape cartridge according to claim 1, wherein the label includes a non-contact communication medium in which information indicating the identifier is stored.

11. A magnetic tape drive system comprising:

a processor, wherein the processor is configured to:

acquire a label image including an image region showing the label provided on the magnetic tape cartridge according to claim 1; and control reading and writing processing with respect to a magnetic tape provided in the magnetic tape cartridge based on a result of determining the attachment state of the label indicated by the marking in the label image.

12. The magnetic tape cartridge according to claim 1, wherein the marking is a groove formed continuously from a second region of the case where the label is provided to the first region of the case where the label is not provided.

13. The magnetic tape cartridge according to claim 1, wherein the marking is formed at a position other than a barcode reading region on the surface of the label.

14. The magnetic tape cartridge according to claim 1, wherein the marking comprises a residue of the label, altered by irradiation with laser light, remaining in a groove that is continuously formed from a second region of the case where the label is provided to the first region of the case where the label is not provided.

15. The magnetic tape cartridge according to claim 1, wherein the marking separates the label into a first portion that remains on the case as the label is peeled off and a second portion that is peeled off as the label is peeled off.

\* \* \* \* \*